United States Patent
Feng

(10) Patent No.: US 10,821,620 B2
(45) Date of Patent: Nov. 3, 2020

(54) ADJUSTABLE VEGETABLE FOOD MACHINE

(71) Applicant: Shengli Feng, Taizhou (CN)

(72) Inventor: Shengli Feng, Taizhou (CN)

(*) Notice: Subject to any disclaimer, the term of this patent is extended or adjusted under 35 U.S.C. 154(b) by 126 days.

(21) Appl. No.: 16/011,536

(22) Filed: Jun. 18, 2018

(65) Prior Publication Data
US 2019/0291291 A1    Sep. 26, 2019

(30) Foreign Application Priority Data

Mar. 20, 2018   (CN) .......................... 2018 1 0227229

(51) Int. Cl.
| | |
|---|---|
| *B26D 3/26* | (2006.01) |
| *B26D 3/28* | (2006.01) |
| *A47J 17/16* | (2006.01) |
| *A23N 7/02* | (2006.01) |

(52) U.S. Cl.
CPC .............. *B26D 3/26* (2013.01); *A23N 7/026* (2013.01); *A47J 17/16* (2013.01); *B26D 3/283* (2013.01); *B26D 2003/285* (2013.01)

(58) Field of Classification Search
CPC .......... B26D 3/283; B26D 3/26; B26D 3/185; B26D 3/11; A47J 17/00; A47J 17/02; A47J 17/16; A23N 7/02; A23N 7/026

USPC ......... 99/537, 538, 594, 595; 83/425.1, 733, 83/865, 932
See application file for complete search history.

(56) References Cited

U.S. PATENT DOCUMENTS

| | | | | |
|---|---|---|---|---|
| 6,053,098 A | * | 4/2000 | Yamamoto | B26D 3/11 83/425.1 |
| 2016/0257013 A1 | * | 9/2016 | Exley | B26D 3/11 |

FOREIGN PATENT DOCUMENTS

| | | | | |
|---|---|---|---|---|
| CA | 2685993 A1 | * | 5/2010 | B26D 3/283 |
| EP | 0965418 A1 | * | 12/1999 | B26D 3/283 |

* cited by examiner

*Primary Examiner* — Reginald Alexander
(74) *Attorney, Agent, or Firm* — Polsinelli PC

(57) ABSTRACT

An adjustable vegetable food machine is provided. A T-shaped chute is provided lengthwise on and penetrates through a top surface of the main body frame with a food fixing mechanism being detachably mounted therein. The bottom of the food fixing mechanism is provided with a slider slidable along the T-shaped chute. A dismountable food cutting mechanism is provided on the main body frame and includes a panel, a knife seat connected to the panel through a rotating shaft, a rear cover, a push button lock, and a shift push button. The shift push button slides along a length direction of the slot to adjust a cutting angle of the knife seat with respect to the front of the panel. The structure of the present invention is simple and safe, convenient for disassembly and assembly and cleaning, and convenient for storage.

7 Claims, 13 Drawing Sheets

ADJUSTABLE VEGETABLE FOOD MACHINE

TECHNICAL FIELD

The present invention relates to a vegetable processing device, and in particular to an adjustable vegetable food machine.

BACKGROUND

Specialized Vegetable cutting device has been adopted by more and more families in place of traditional cutting tools to process vegetables such as potatoes, radishes, and cucumbers, mainly in consideration of safety and convenience.

However, conventional vegetable cutting devices are generally of a monolithic type which is inconvenient to be disassembled and assembled, and has difficulty in cleaning after cutting operation. The residual vegetables are prone to bacterial growth and then easily deteriorate. At the same time, it has a big volume which takes up a large space when stored. Besides, as the cutting blade is not adjustable, it is necessary to replace the blade set when the vegetable is to be cut in different thicknesses in use, which is cumbersome and inconvenient to use.

SUMMARY

In view of the foregoing, the present invention provides an adjustable vegetable food machine which has a simple appearance, a more humanized design, a compact and reasonable structure, good practicality, convenient and safe operation, and easy cleaning. Thanks to the DIY detachable design, with a more optimized structure, the cost of product model opening is greatly reduced.

The present invention provides an adjustable vegetable food machine, comprising a main body frame. A T-shaped chute is provided lengthwise along a top surface of the main body frame. The T-shaped chute penetrates through a side surface of the main body frame. A food fixing mechanism is detachably installed on the T-shaped chute. The bottom of the food fixing mechanism is provided with a slider which is adapted to the T-shaped chute and slidable along a length direction of the T-shaped chute. A dismountable food cutting mechanism is provided on the main body frame at the front of the T-shaped chute. The food cutting mechanism includes a panel, a knife seat, a rear cover, a push button lock, and a shift push button. The knife seat is connected to the panel through a rotating shaft and an angle thereof with the front of the panel can be fine tuned through the shift push button to realize the function of cutting vegetables. The rear cover is detachably connected to a rear surface of the panel through the push button lock. The rear cover has a discharge opening at the front thereof. The panel is provided at a side surface thereof with a slot in which the shift push button is provided. The shift push button can slide along a length direction of the slot to adjust a cutting angle of the knife seat with respect to the front of the panel.

The food fixing mechanism may comprise a support seat disposed on the slider. The support seat is provided at its top with a through hole along the length direction of the T-shaped chute. A rotating shaft is mounted in the through hole. A tooth disc is arranged at a front end of the rotating shaft. A protruding tooth is provided on a surface of the tooth disc. A handle is arranged at a rear end of the rotating shaft and rotates to drive the tooth disc to rotate.

The shift push button may have three gear positions along the length direction of the slot. The three gear positions correspond to three deflection angles of the knife seat with respect to the front of the panel.

Optionally, one side of the shift push button may be a push button located outside the panel, and the other side extends inwardly to form two support adjustment blocks. The knife seat includes a cutting blade and an adjustment plate. A bar-shaped long hole is provided along a length direction of the adjustment plate. The surface of the bar-shaped long hole is formed of stepped sections raised in height successively along the length direction. A smooth transition occurs between adjacent stepped sections. The support adjustment block of the shift push button is located in the stepped section. The support adjustment block, when in each stepped sections of different heights, corresponds to different gears of the shift push button.

The panel is provided with replaceable baffles having different cutting functions. The surface of the baffle is a flat plate or has a zigzag blade. The flat plate may be a slice baffle, which is divided into a fine planer baffle and a rough planer baffle, depending on different zigzag blades.

The main body frame under the food cutting mechanism is connected to a tray through a rotating shaft. The tray is located under the main body frame under a normal condition, and when in use, can be turned outwards to place one end of a storage disc under the tray. The cut vegetables smoothly slide into the storage disc through the guide of the tray.

A function board accommodation portion is provided on the bottom surface of the main body frame.

The product of the present invention has the advantages of simple structure, fewer parts and components, convenient disassembly and assembly and replacement, good versatility and interchangeability, low manufacturing cost, and safe and reliable use. The humanization of operation provides a good operation experience and interest. The product can be disassembled and cleaned after use, and all parts can be easily stored.

Figure 1:
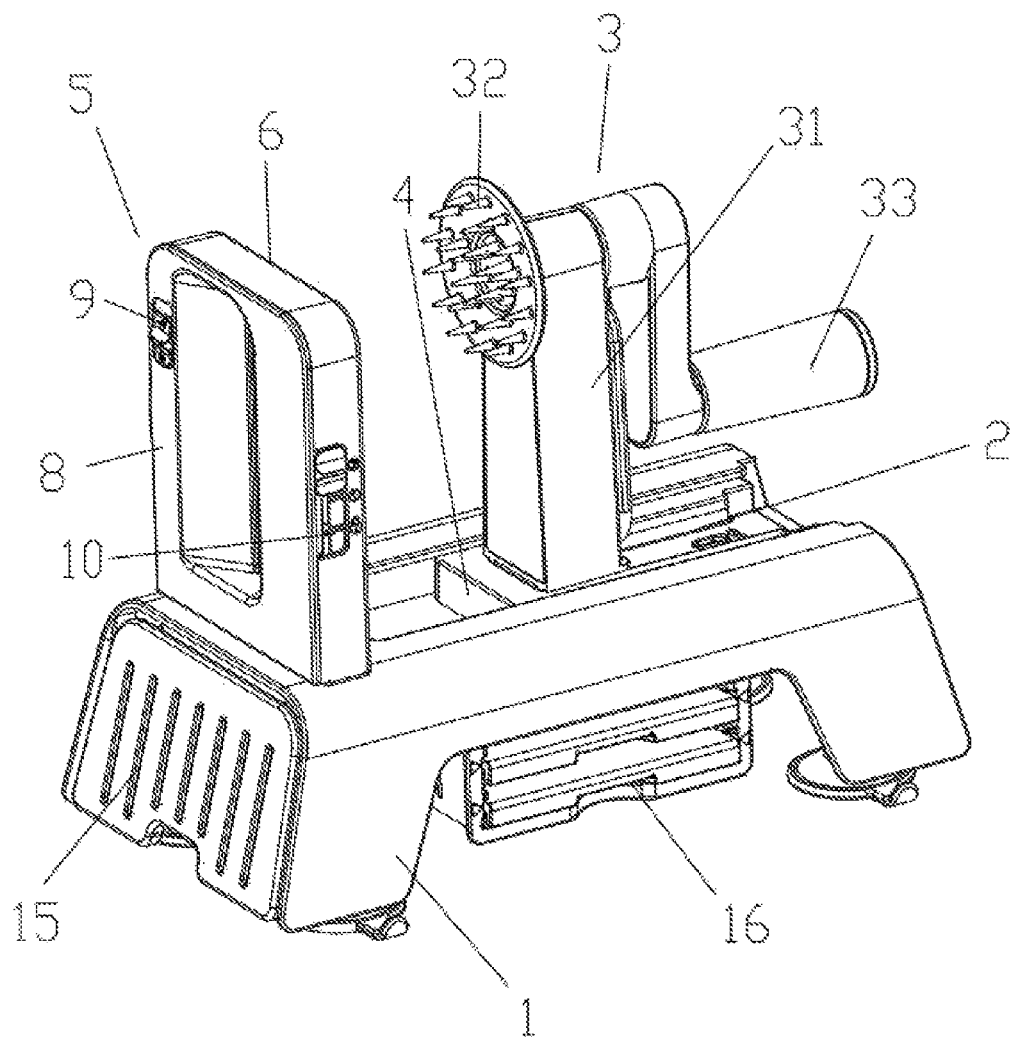
FIG. 1 is a schematic structural view of an adjustable vegetable food machine according to an embodiment of the present invention.
Figure 2:
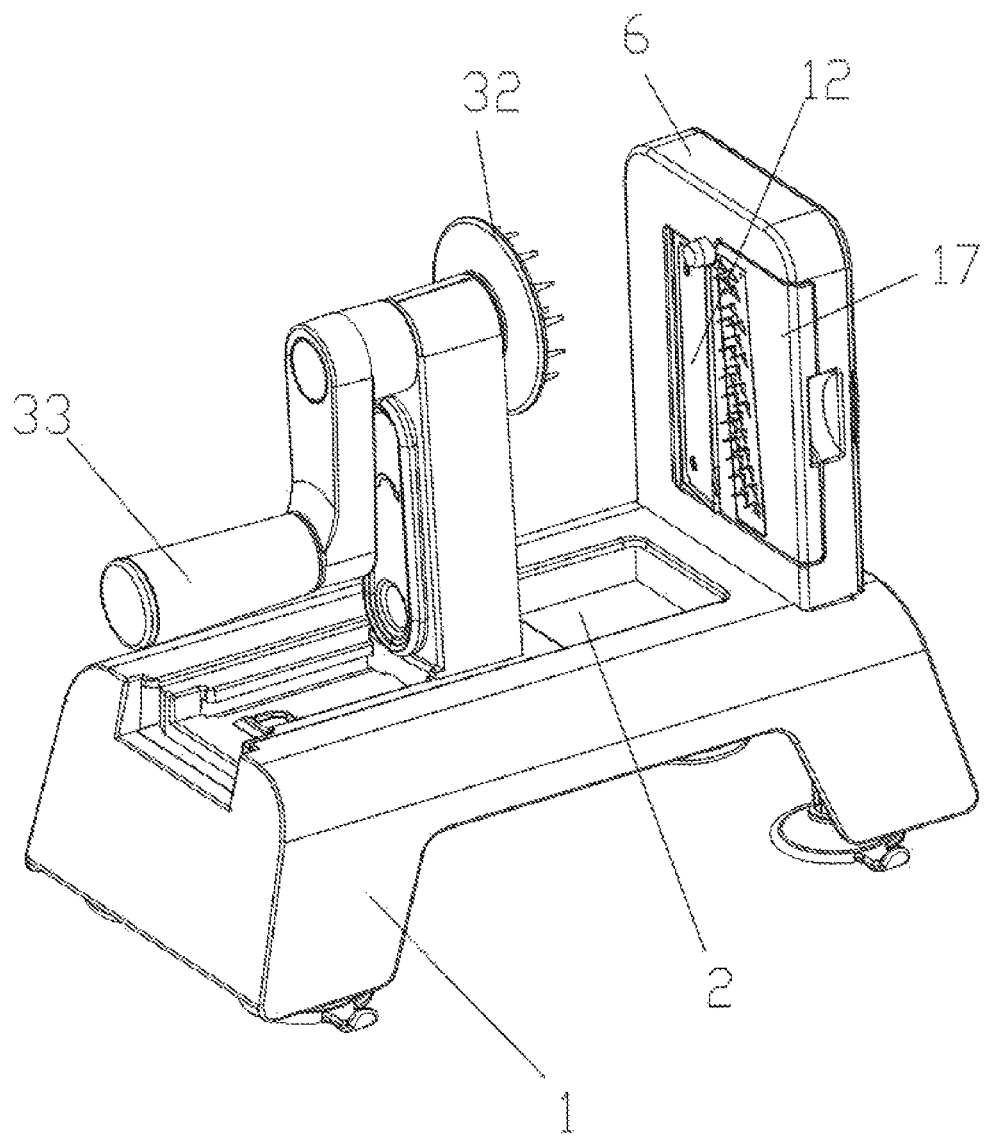
FIG. 2 is a schematic structural view of the example shown in FIG. 1 in another perspective.
Figure 3:
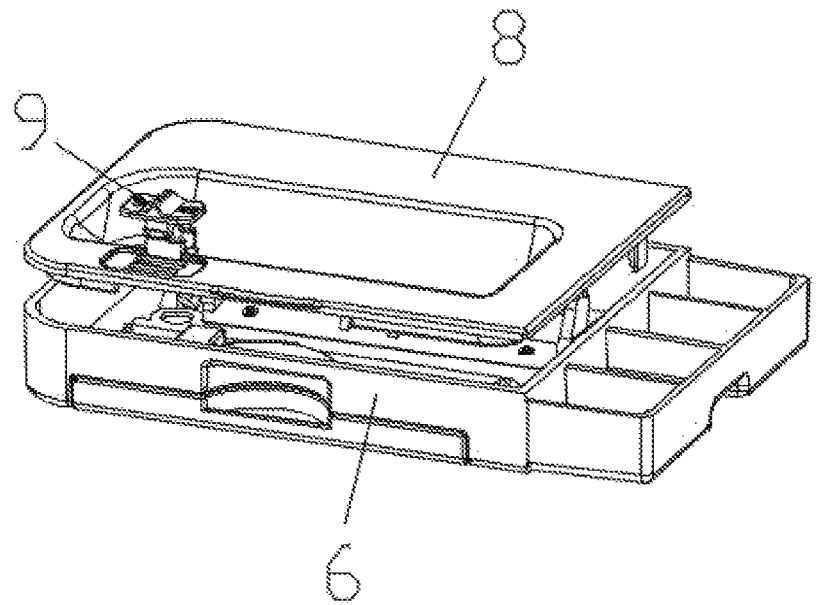
FIG. 3 is a schematic view of the structure between a panel, a rear cover and a push button lock in the example shown in FIG. 1.
Figure 4:
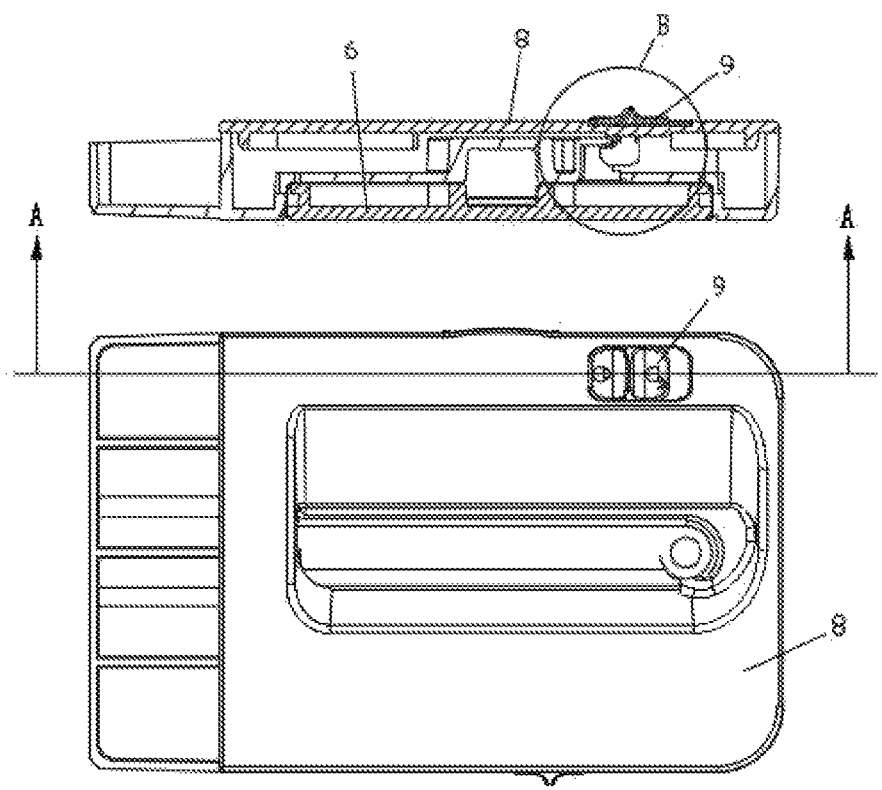
FIG. 4 is a front view of the product shown in FIG. 3 and a sectional view of FIG. 4 itself along A-A direction.
Figure 5:
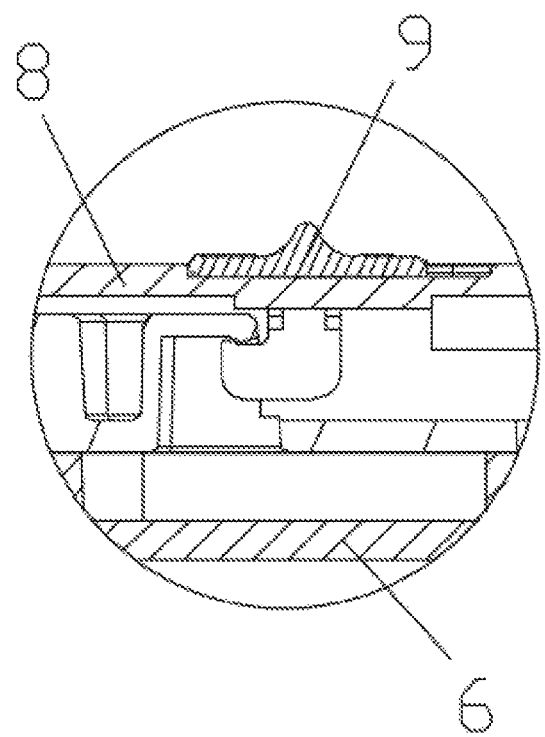
FIG. 5 is a partial enlarged view of a locked state of the push button lock at location B in FIG. 4.
Figure 6:
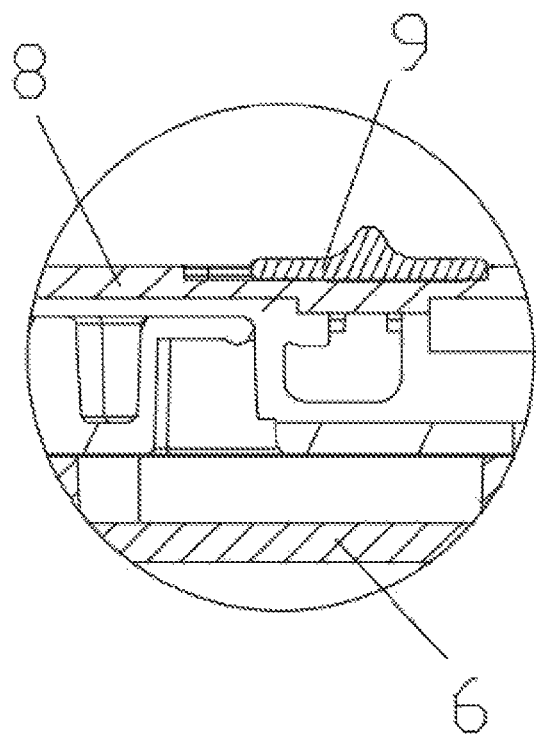
FIG. 6 is a partial enlarged view of an unlocked state of the push button lock at location B in FIG. 4.
Figure 7:
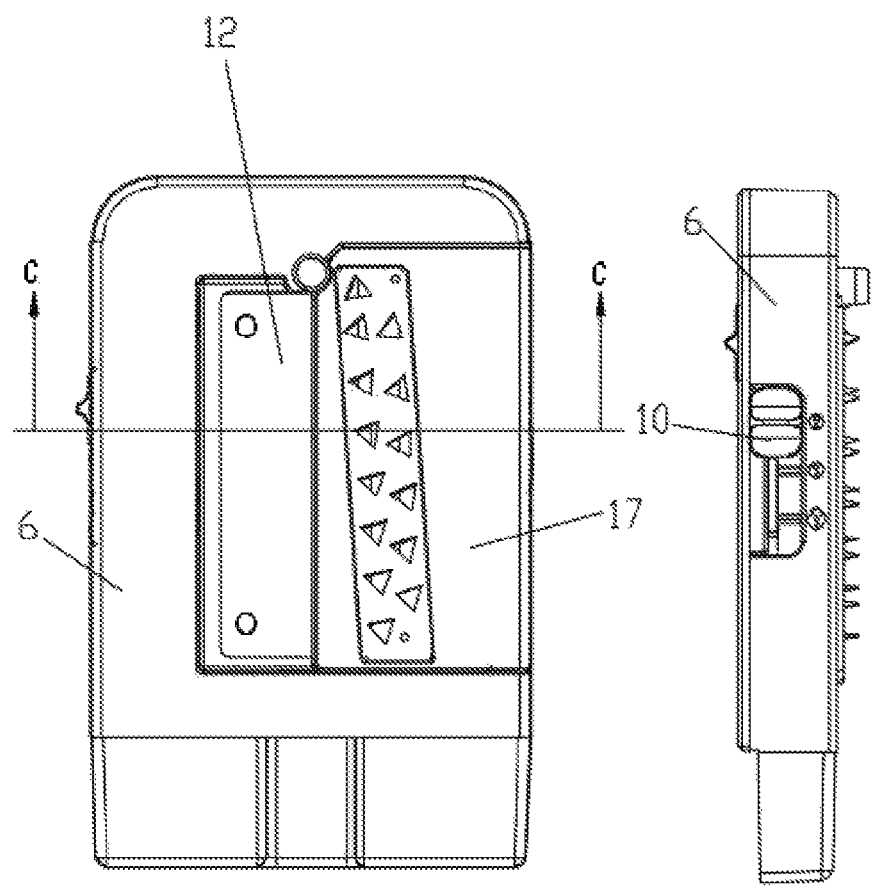
FIG. 7 is a front view and a left view of a food cutting mechanism of the present invention.
Figure 8:
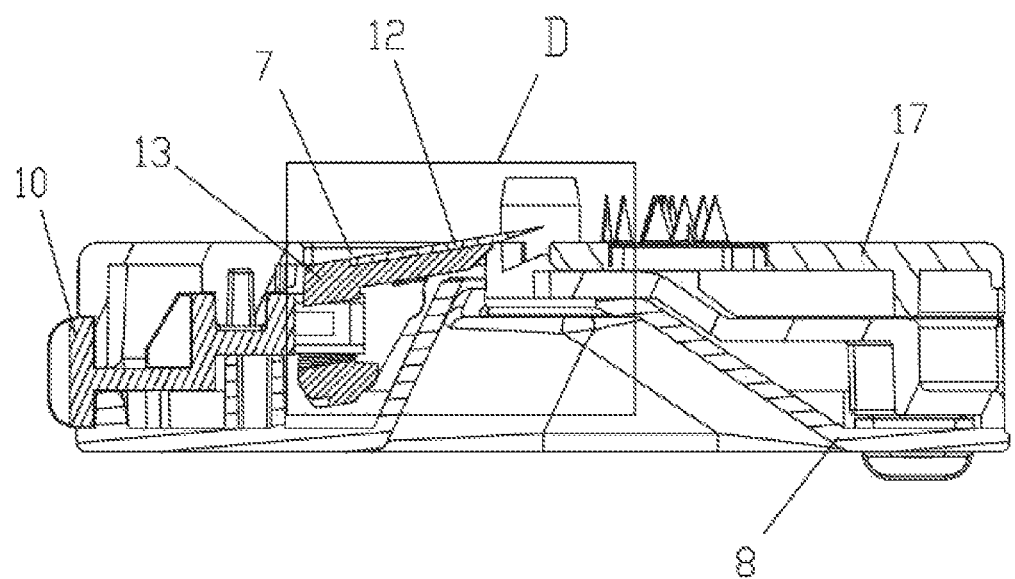
FIG. 8 is a sectional view taken along C-C direction in FIG. 7.
Figure 9:
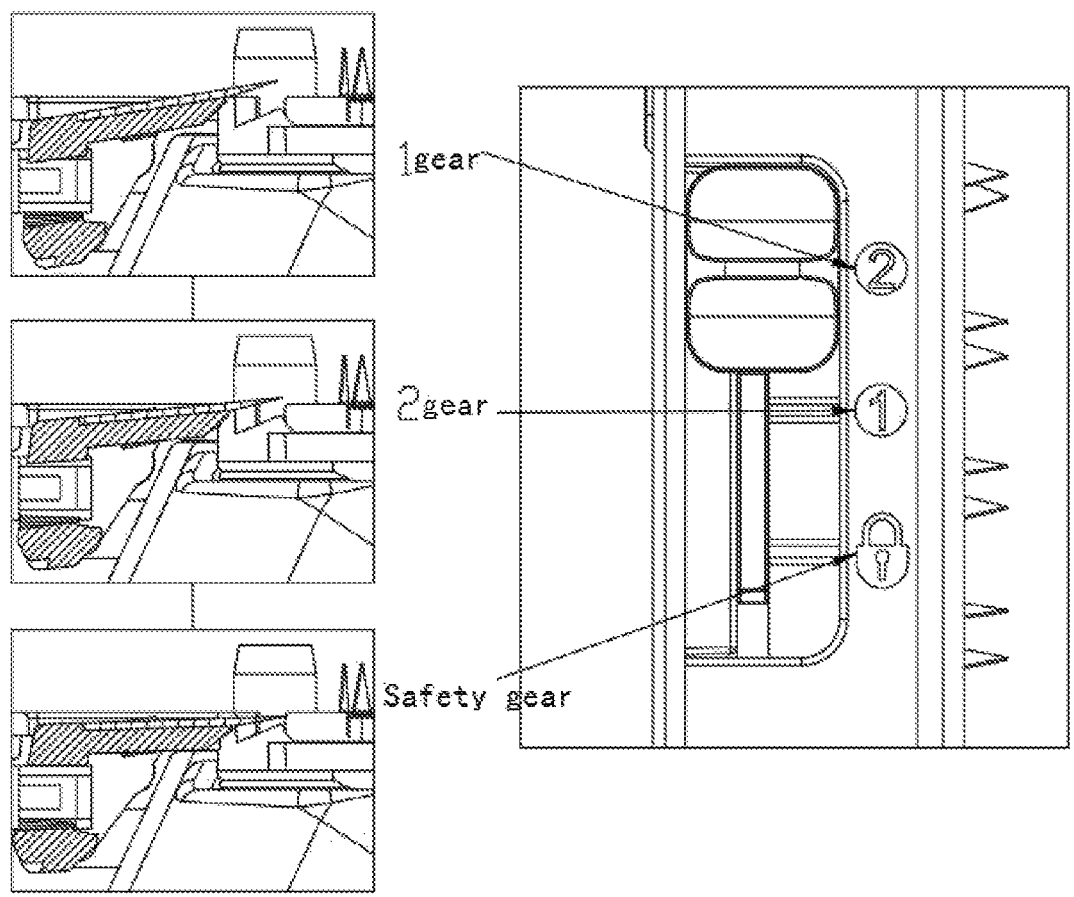
FIG. 9 is a schematic view of the structure at location D in the three states of the shift push button in FIG. 8.
Figure 10:
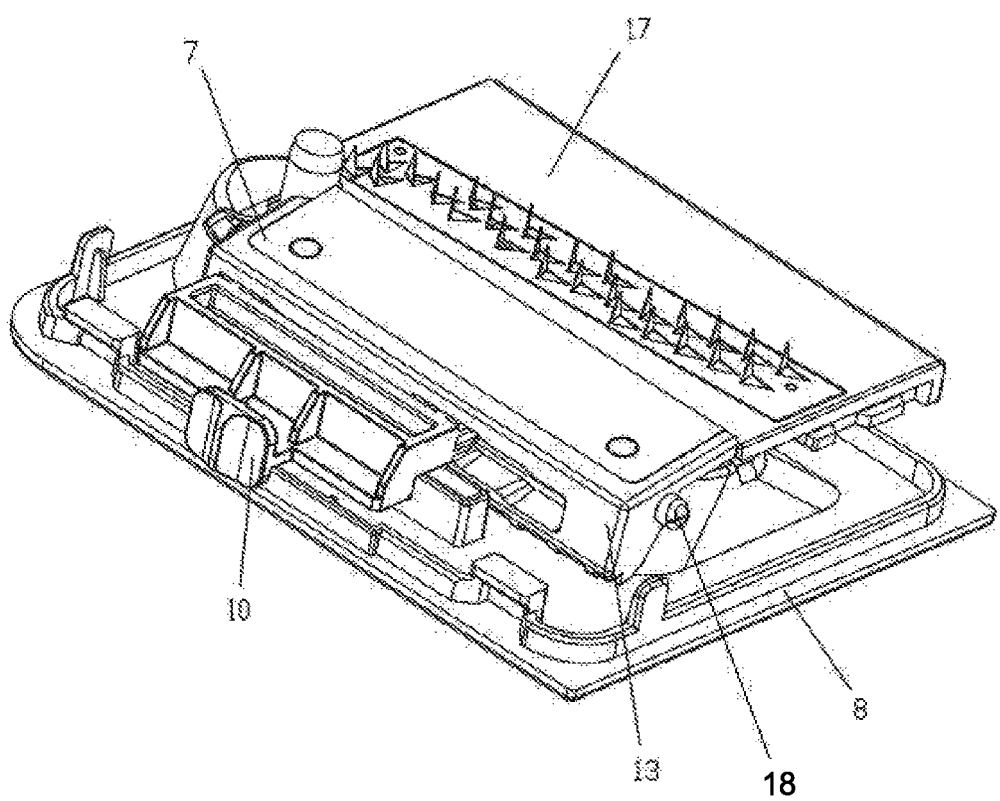
FIG. 10 is a schematic view of the structure between the knife seat, the shift push button, the baffle, and the rear cover according to an embodiment of the present invention.
Figure 11:
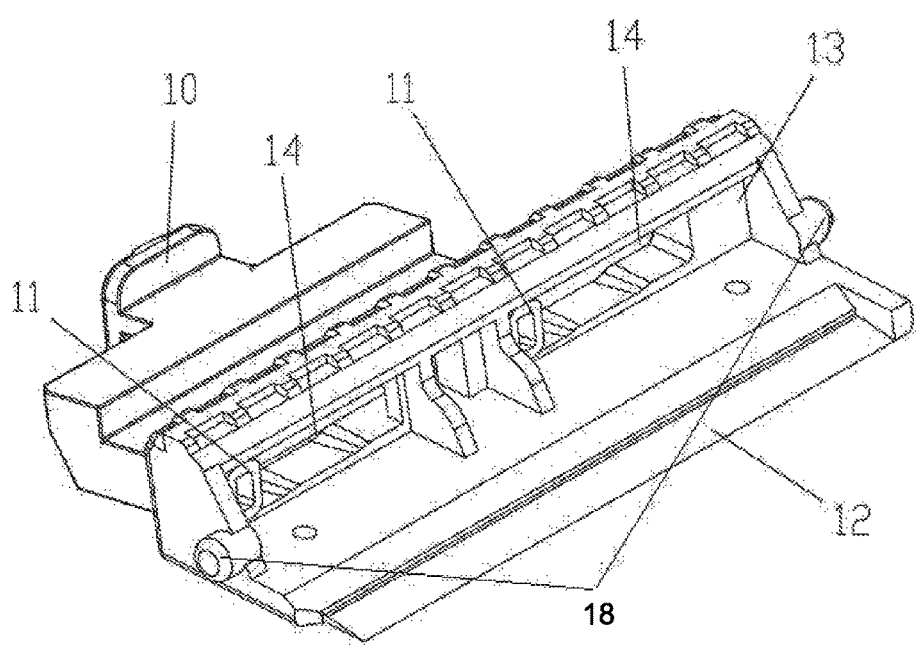
FIG. 11 is a schematic view of the structure between the knife seat and the shift push button in FIG. 10.
Figure 12:
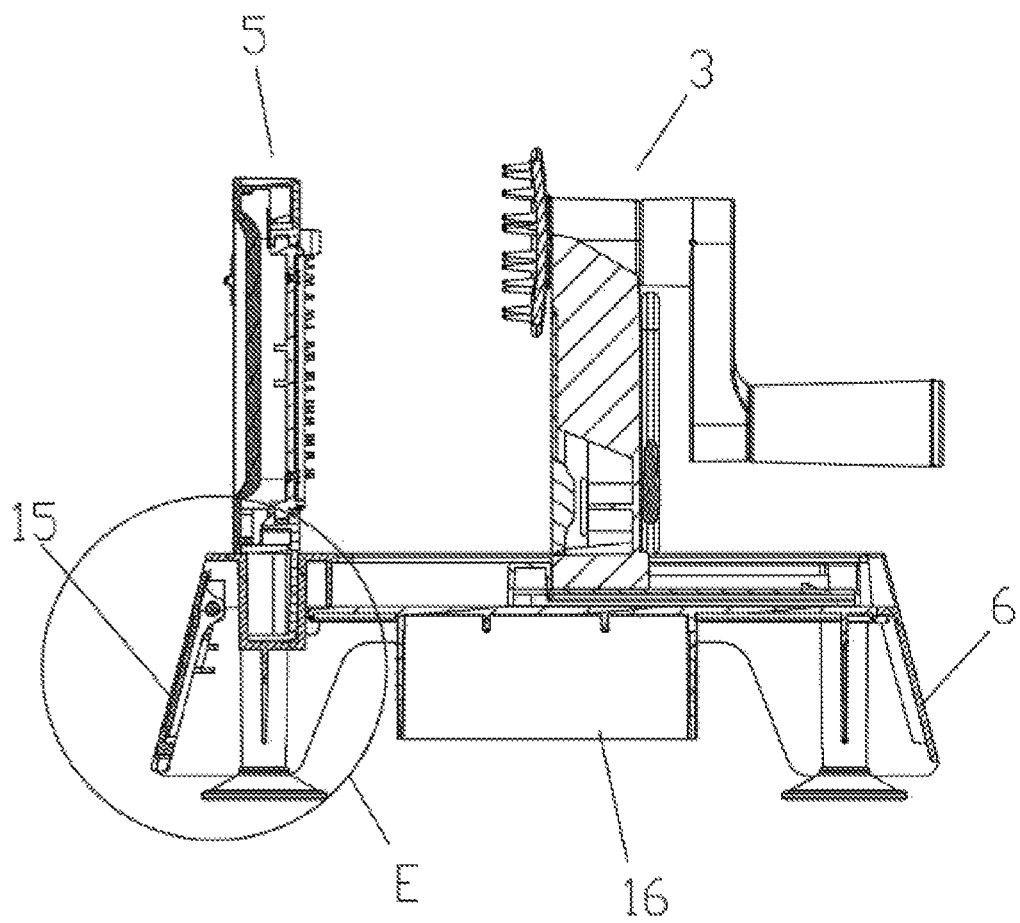
Figure 13:
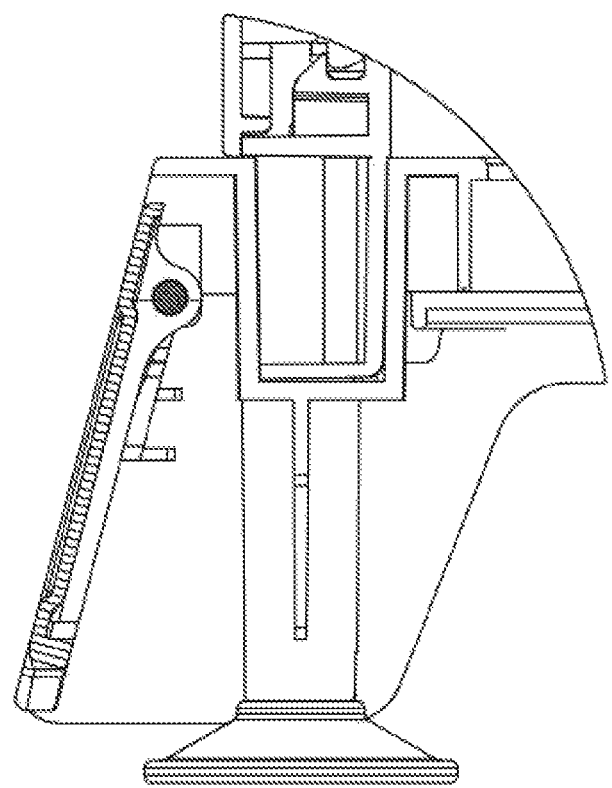
Figure 14:
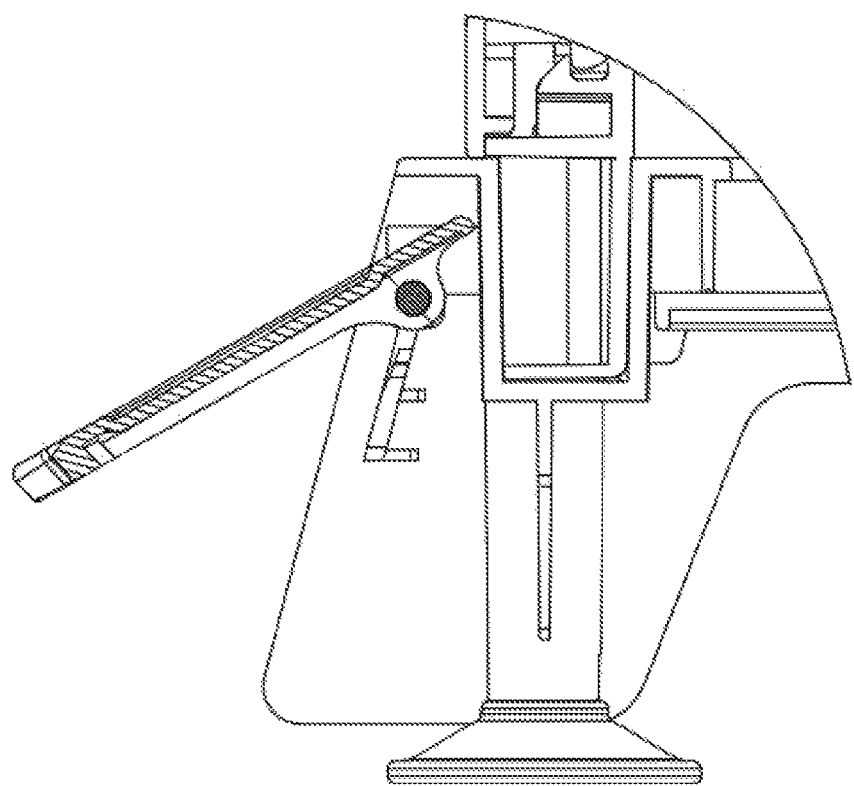

12 is a sectional view of an adjustable vegetable food machine according to an embodiment of the present invention;

FIG. 13 is a schematic structural view of the tray in a folded state at location E in FIG. 12;

FIG. 14 is a schematic structural view of the tray in an unfolded state at location E in FIG. 12, 1—main body frame; 2—T-shaped chute; 3—food fixing mechanism; 31—support seat; 32—tooth disc; 33—handle; 4—slider; 5—food cutting mechanism; 6—panel; 7—knife seat; 8—rear cover; 9—push button lock; 10—shift push button; 11—support adjustment block; 12—cutting blade; 13—adjustment plate; 14—bar-shaped long hole; 15—tray; 16—function board storage; 17—baffle; 18—rotating shaft.

DETAILED DESCRIPTION

The embodiments of the present invention will be further described in detail below with reference to the accompanying drawings.

As shown in FIG. 1 to FIG. 14, an embodiment of the present invention provides an adjustable vegetable food machine including a main body frame 1. A T-shaped chute 2 is formed lengthwise on a top surface of the main body frame 1. A food fixing mechanism 3 is detachably installed on the T-shaped chute 2. The bottom of the food fixing mechanism 3 has a slider 4 matching with the T-shaped chute 2 and is slidable along the length direction of the T-shaped chute 2.

A detachable food cutting mechanism 5 is provided at the front of the T-shaped chute 2 on the main body frame 1. The food cutting mechanism 5 includes a panel 6, a knife seat 7, a rear cover 8, a push button lock 9, and a shift push button 10. The knife seat 7 is connected to the panel 6 through a rotating shaft 18, and the angle with the front of the panel 6 can be fine-tuned through the shift push button 10 to achieve the function of adjusting the thickness of the cut vegetables. The rear cover 8 is detachably connected to a rear surface of the panel 6 through the push button lock 9. The rear cover 8 has a discharge opening at the front thereof. A slot is provided on a side of the panel 6. The shift push button 10 is disposed in the slot. The shift push button 10 slides along the length direction of the slot to adjust an angle serving as a cutting angle between the knife seat 7 and the front surface of the panel 6.

The food fixing mechanism 3 includes a support seat 31 disposed on the slider 4. The support seat 31 is provided with a through hole on the top along the length direction of the T-shaped chute 2. A rotating shaft is installed in the through hole. A front end of the rotating shaft is provided with a tooth disc 32. The surface of the tooth disc 32 is provided with protruding teeth. A handle 33 is arranged at a rear end of the rotating shaft. The handle 33 rotates to drive the tooth disc 32 to rotate.

The shift push button 10 has three gear positions along the length direction of the slot. The three gear positions correspond to three deflection angles of the knife seat 7 with respect to the front surface of the panel 6.

One side of the shift push button 10 is a push button located outside the panel 6, and the other side extends inwardly to form two support adjustment blocks 11. The knife seat 7 includes a cutting blade 12 and an adjustment plate 13. A bar-shaped long hole 14 is provided along the length direction of the adjustment plate 13. A set of stepped sections raised successively are formed along the length direction on the surface of the bar-shaped long hole 14 with smooth transition between adjacent stepped sections. The support adjustment block 11 of the shift push button 10 is provided in the stepped section. The support adjustment block 11 corresponds to different shift positions of the shift push button 10 in respective stepped sections of different heights.

The panel 6 can be provided with a replaceable baffle 17 that provides different cutting functions. The baffle 17 may be a slice baffle formed by a flat plate, a fine planer baffle, or a rough planer baffle depending on different zigzag blade used.

The main body frame 1 under the food cutting mechanism 5 is connected to a tray 15 through a rotating shaft. The tray 15 is located under the main body frame 1 under normal conditions. When used, the tray 15 can be turned outwards to place one end of a storage disc under the tray 15. Vegetables after cutting can smoothly slide into the storage disc through the guide of the tray 15.

A function board accommodation portion 16 is provided on the bottom surface of the main body frame 1.

In use, vegetables such as cucumbers, radishes, potatoes, etc. that need to be sliced or shredded are fixed on the tooth disc 32, and the vegetables to be cut are driven by pushing the food fixing mechanism 3 to move forward along the T-shaped chute 2 to the food cutting mechanism 5. Rotating the handle 33 causes the vegetable to rotate, and the rotating vegetable is in contact with the cutting blade 12 for cutting. The fine planer baffles or rough planer baffles with zigzag blades can be selectively installed as required to cut the vegetables into filaments or thick threads. A slice baffle may be installed to slice the vegetables. The cut vegetables are led out through the discharge opening at the rear cover 8. One end of the storage disc is placed under the tray 15, and the cut sheet or filamentous vegetables can be directly guided into the storage disc. During operation, the cutting blade 12 of the knife seat 7 can be adjusted by the shift push button 10 to cut the food into slices or filaments of different thicknesses. The whole operation during the process is easy and safe.

In addition, the food fixing mechanism 3 and the food cutting mechanism 5 can be disassembled as needed to facilitate cleaning. When the shift push button 10 is switched to a safety gear position during storage, the cutting edge of the cutting blade 12 of the knife seat 7 is lower than the plane of the panel 6 to avoid cutting operation. After the upper baffle is replaced, even if the fingers directly touch the surface of the panel, the fingers will not be hurt, which provides a high safety. When stored, the food cutting mechanism 5 and the food fixing mechanism 3 can be detached and put into the main body frame 1, so that the storage space becomes smaller and the storage is more convenient.

The above are merely preferred embodiments of the present invention, and do not limit the present invention in any form. Any simple modifications, equivalent changes or decorations made to the above embodiments according to the technical principle of the present invention still belong to the technical solution of the present invention.

What is claimed is:

1. An adjustable vegetable food machine, comprising a main body frame, wherein a T-shaped chute is provided lengthwise along a top surface of the main body frame, the T-shaped chute penetrates through a side surface of the main body frame and is detachably mounted with a food fixing mechanism, the bottom of the food fixing mechanism is provided with a slider which is adapted to the T-shaped chute and slidable along a length direction of the T-shaped chute, and wherein a dismountable food cutting mechanism is provided on the main body frame at the front of the T-shaped chute, the food cutting mechanism includes a panel, a knife seat, a rear cover, a push button lock, and a shift push button, the knife seat is connected to the panel through a rotating shaft and an angle thereof with the front of the panel can be fine tuned through the shift push button to realize the function of cutting vegetables into different thicknesses, the rear cover is detachably connected to a rear surface of the panel through the push button lock, the rear cover has a discharge opening at the front thereof, the panel is provided at a side surface thereof with a slot in which the shift push button is provided which is capable of sliding along a length direction of the slot to adjust a cutting angle of the knife seat with respect to the front of the panel.

2. The adjustable vegetable food machine according to claim 1, wherein the food fixing mechanism comprises a support seat disposed on the slider, the support seat is provided at its top with a through hole along the length direction of the T-shaped chute, a rotating shaft is mounted in the through hole, a tooth disc is arranged at a front end of the rotating shaft, a protruding tooth is provided on a surface of the tooth disc, a handle is arranged at a rear end of the rotating shaft, and the handle rotates to drive the tooth disc to rotate.

3. The adjustable vegetable food machine according to claim 1, wherein the shift push button has three gear positions along the length direction of the slot, and the three gear positions correspond to three deflection angles of the knife seat with respect to the front of the panel.

4. The adjustable vegetable food machine according to claim 3, wherein one side of the shift push button is a push button located outside the panel, and two support adjustment blocks extends inwardly from the other side, the knife seat comprises a cutting blade and an adjustment plate, a bar-shaped long hole is provided along a length direction of the adjustment plate and is formed of stepped sections raised successively along the length direction, a smooth transition occurs between adjacent stepped sections, the support adjustment block of the shift push button is provided within the stepped section, and the support adjustment block in each of the stepped sections of different heights corresponds to different gears of the shift push button.

5. The adjustable vegetable food machine according to claim 4, wherein the panel is provided with replaceable baffles requiring different cutting functions, the surface of the baffle is a flat plate being a slice baffle, or has a zigzag blade which makes the baffle a fine planer baffle or a rough planer baffle depending on different zigzag blades.

6. The adjustable vegetable food machine according to claim 1, wherein the main body frame under the food cutting mechanism is connected to a tray through a rotating shaft, the tray is normally located under the main body frame and can be turned outwards in use to place one end of a storage disc under the tray so that the cut vegetables smoothly slide into the storage disc through the guide of the tray.

7. The adjustable vegetable food machine according to claim 1, wherein a function board accommodation portion is provided on the bottom surface of the main body frame.

* * * * *